United States Patent [19]

Manning

[11] 4,021,073
[45] May 3, 1977

[54] COMBINED VENT AND ESCAPE HATCH

[76] Inventor: Donald L. Manning, 4002 Normanwood Drive, Orchard Lake, Mich. 48033

[22] Filed: Mar. 18, 1976

[21] Appl. No.: 668,100

[52] U.S. Cl. ............................. 296/137 B; 49/141; 52/72; 98/2.14; 114/203; 292/228; 292/263
[51] Int. Cl.² .......................................... B60J 7/10
[58] Field of Search ............ 296/137 R, 137 B; 114/203, 71; 49/141; 52/72, 200; 98/2.14; 292/DIG. 30, DIG. 31, 128, 228, 263

[56] References Cited

UNITED STATES PATENTS

| | | | |
|---|---|---|---|
| 2,159,516 | 5/1939 | Ball | 98/2.14 X |
| 2,173,890 | 9/1939 | Tuttle | 296/137 B X |
| 2,372,164 | 3/1945 | Woodhams | 98/2.14 |
| 2,517,303 | 8/1950 | Green | 98/2.14 |
| 3,208,781 | 9/1965 | Appleberry | 292/228 X |
| 3,676,954 | 7/1972 | Rapport et al. | 49/141 |
| 3,972,558 | 8/1976 | Horn | 296/137 B |

FOREIGN PATENTS OR APPLICATIONS 1,240,424  5/1967  Germany .................... 296/137 B

*Primary Examiner*—Joseph F. Peters, Jr.
*Assistant Examiner*—Michael J. Forman
*Attorney, Agent, or Firm*—Reising, Ethington, Barnard, Perry & Brooks

[57] ABSTRACT

A lid for a vehicle roof opening has linkage hinging it to the roof structure accommodating tilting the lid upwardly in either of two directions, or elevating it bodily, for use of the opening to ventilate the vehicle, including provision for separating parts of the hinging linkage to permit swinging the lid fully open for use of the roof opening as an escape hatch. In a modification, the lid is hinged for tilting in only one direction to a ventilating position or swinging to the full open position in the same direction.

7 Claims, 9 Drawing Figures

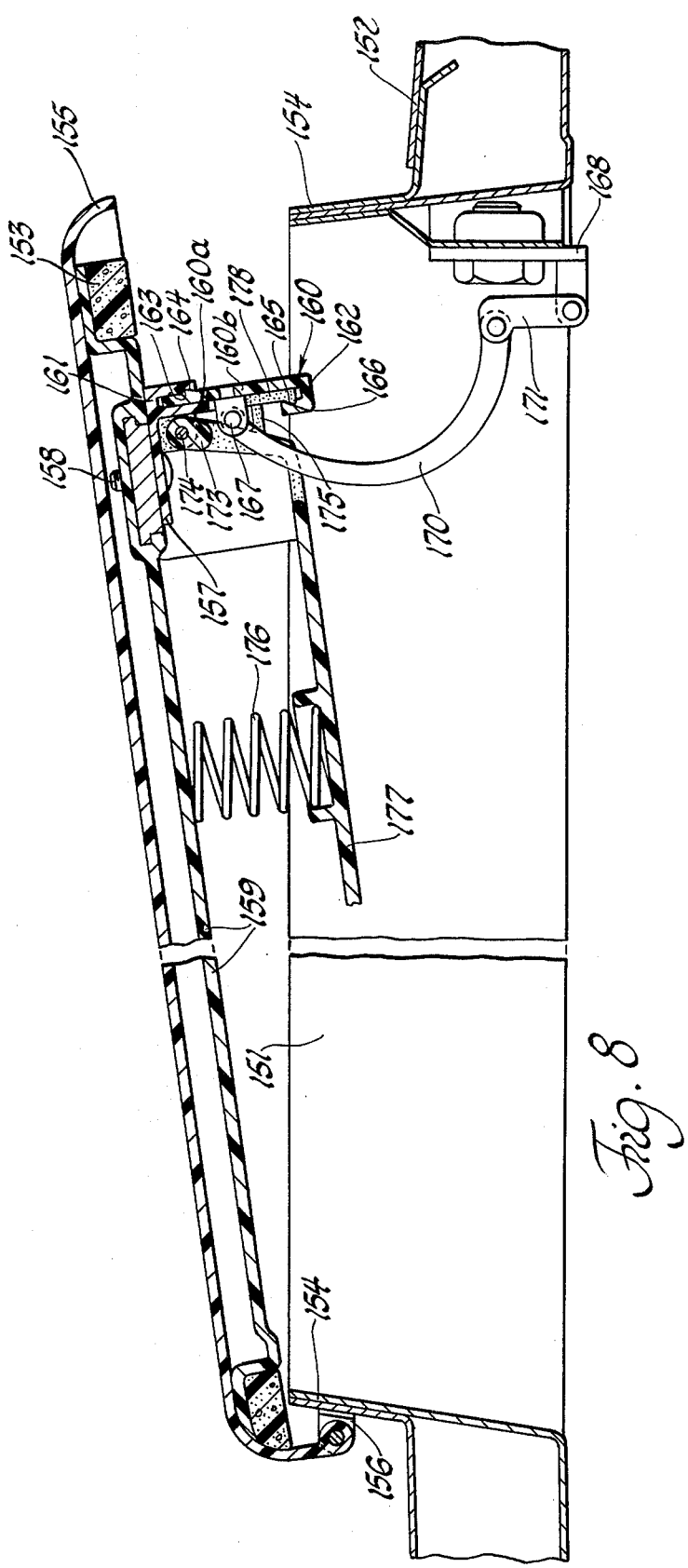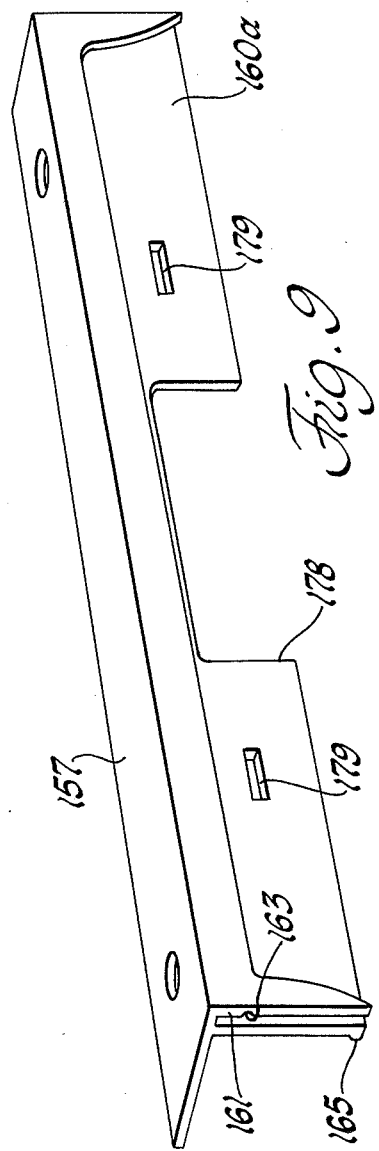

COMBINED VENT AND ESCAPE HATCH

BACKGROUND OF THE INVENTION

My invention relates to roof ventilators for closed vehicles such as buses, trailers, trucks and railway cars, and particularly to an improved closure or lid by which the ventilator opening in the roof of such a vehicle may also serve as an escape hatch for occupants in the vehicle in the event of an accident or other emergency rendering the normal means of egress unusable.

In its more specific aspects my invention provides a lid which in normal operation either closes the roof opening or is raised to a partially elevated position when ventilation of the vehicle so requires, and which can be manually released and forced upwardly to swing fully open in the event of an emergency requiring use of the roof opening as an escape hatch.

I am aware that roof ventilators employing a lid which can be tiled upwardly are well known in the art, including such a lid that can be so tilted in either of two directions for directing air into or exhausting air out the vehicle. U.S. Pats. No. 2,173,890 to Tuttle and U.S. Pat. No. 2,372,164 to Woodhams, for example, show such vehicle roof ventilator panels tiltable upwardly in one direction, and U.S. Pat. No. 2,159,516 to Ball shows one tiltable alternatively for exhaust of air from the vehicle interior by suction or for deflection of air into the vehicle. Also, U.S. Pat. No. 2,517,303 to Green discloses a roof ventilator in which the closure lid may be raised vertically, rather than tilted angularly of the roof opening. The closest prior art to my invention probably is that of U.S. Pat. No. 3,676,954 to Rapport et al. showing a lid for a vehicle roof vent opening which is tiltable upwardly to a venting position by means of worm gear and wheel drive mechanism and which has means for unlatching the housing of the worm mechanism to allow the lid to be swung to a fully open position.

SUMMARY OF THE INVENTION

In accordance with my invention, however, I employ a much simpler, less costly and practically fool-proof structure by which the lid tilting or elevating mechanism, may be disengaged under emergency conditions to enable its full opening movement to an escape hatch position. A noval and advantageous feature of my invention lies also in the fact that it may easily be incorporated in an operating mechanism which enables alternative two-way tilting and direct vertical elevation of such a roof opening lid, as well as in a more simple one-way tiltable vent lid.

Thus, in its more elaborate application to a two-way tiltable and vertically raisable roof vent lid whose alternative positions are made possible by two hinging mechanisms each employing two sets of toggle-type linkages, one of the hinge brackets comprises two separable web-forming parts which can be forced apart by manual upward force applied to the underside of the lid, allowing the lid to be swung fully open for use of the roof opening as an escape hatch. In the case of a roof vent lid which is tiltable upwardly about a single hinge axis to its venting position a generally similar bracket with separable web-section parts is employed for connecting the tilt actuating mechanism to the lid. In each embodiment a release lever is preferably added which is pivotally connected to the underside of the lid, so that when pushed upwardly into abutment with the lid in the course of applying upward force to separate the bracket web sections a projection normally engaging aligned holes in the web sections is withdrawn to release them for separation.

These and other advantages of my invention will be more clearly understood and appreciated from the following description of two embodiments thereof selected to best illustrate the principles involved and preferred means for carrying out the same, having reference to the drawings, wherein:

BRIEF DESCRIPTION OF DRAWINGS

FIG. 8 is a view similar to FIG. 7 but with the lid tilted to its partially open, or ventilating position.

FIG. 9 is a detail view in perspective of the upper of the two separable bracket parts shown in FIGS. 7 and 8.

DETAILED DESCRIPTION OF THE PREFERRED EMBODIMENTS

Figure 1:
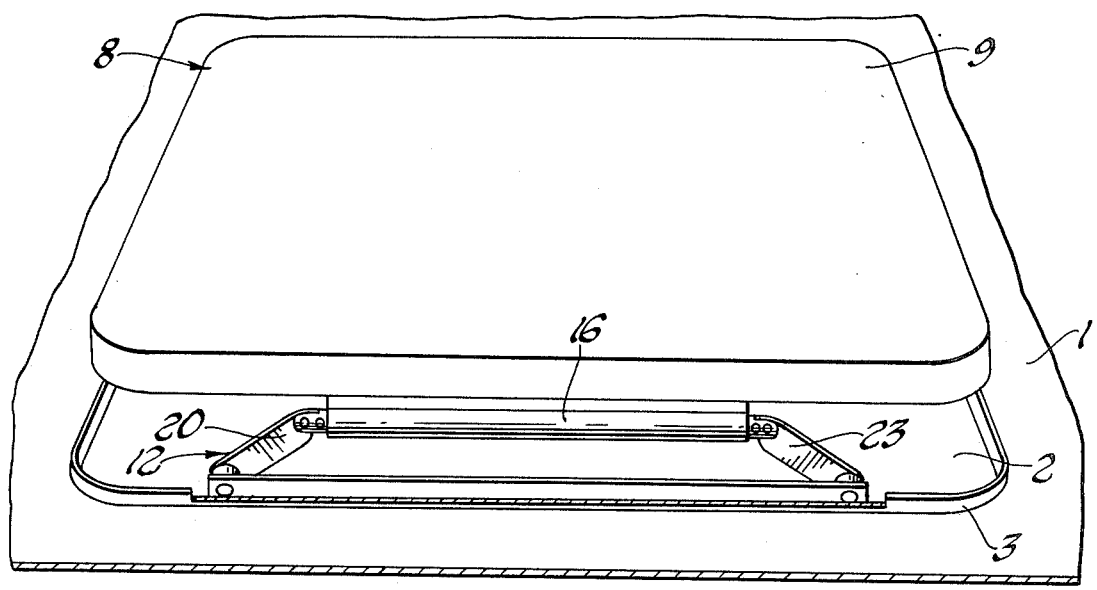
FIG. 1 is a perspective view of a portion of a vehicle roof with an opening therein and a lid therefor constructed in accordance with the invention and shown in partially open or ventilating position.
Figure 2:
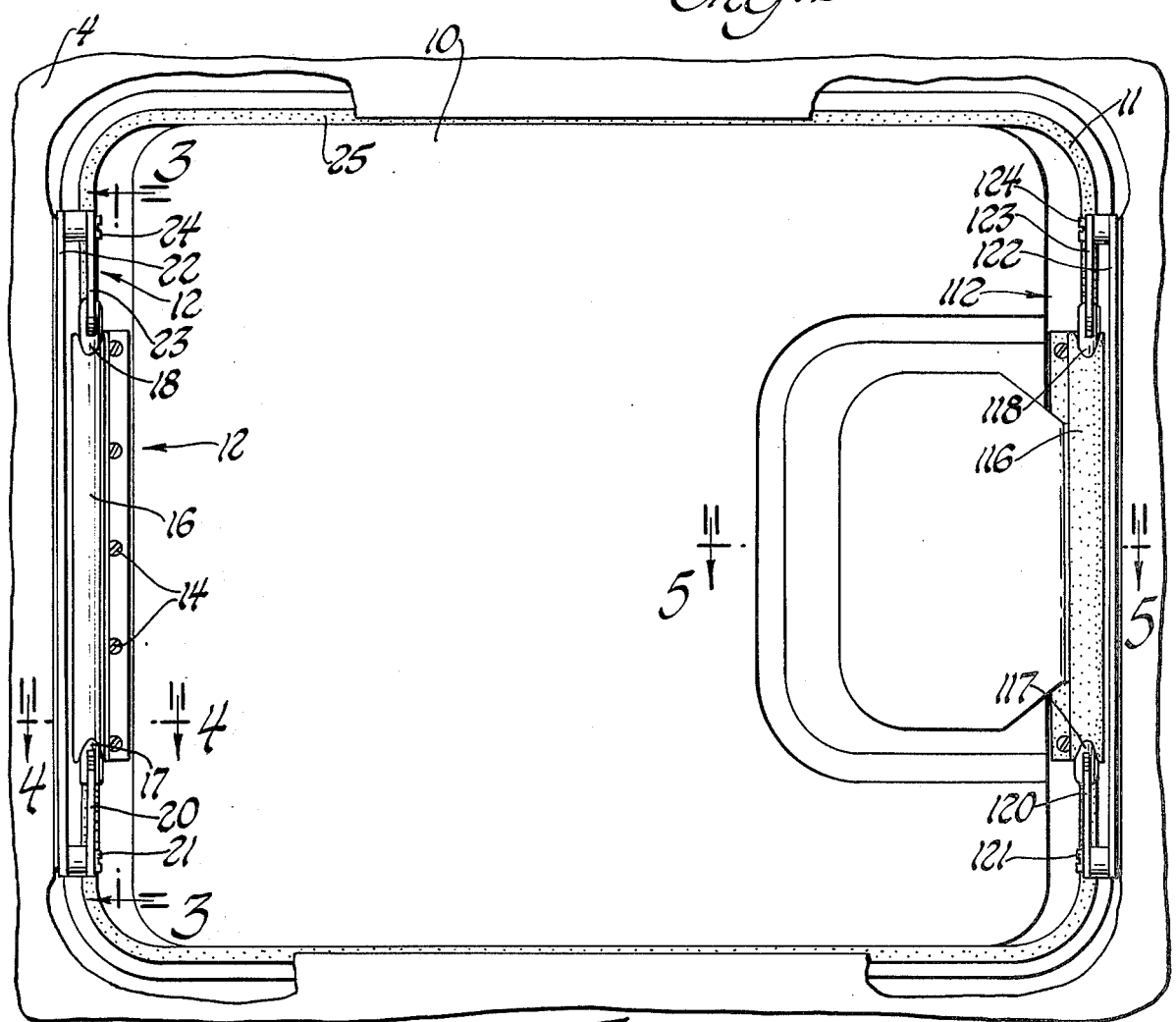
FIG. 2 is a bottom view of the roof opening and lid shown in FIG. 1, but with the lid in closed position.
Figure 3:
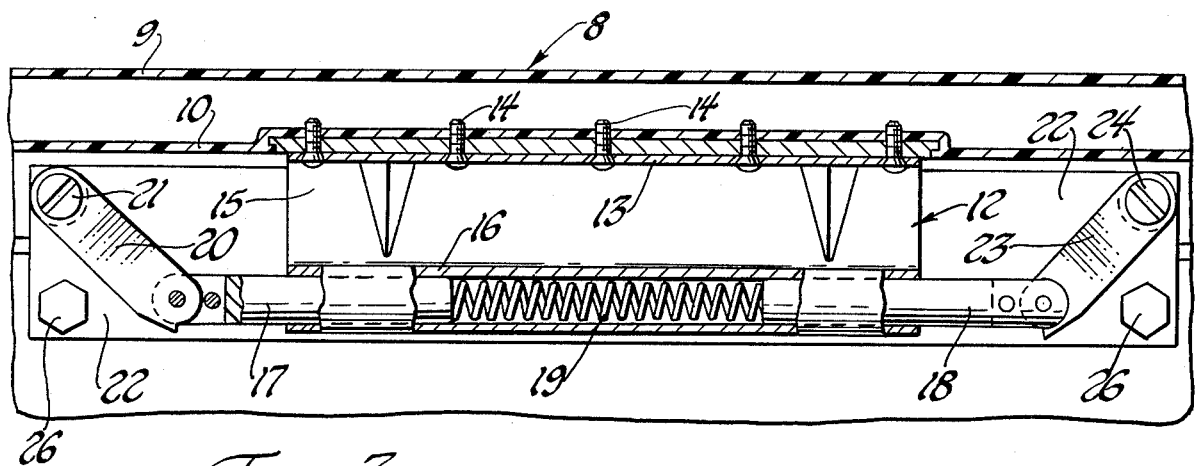
FIG. 3 is an enlarged fragmentary view taken in the direction of the arrows 3—3 of FIG. 2 showing one of the hinging mechanisms, certain parts being broken away and in section.
Figure 4:
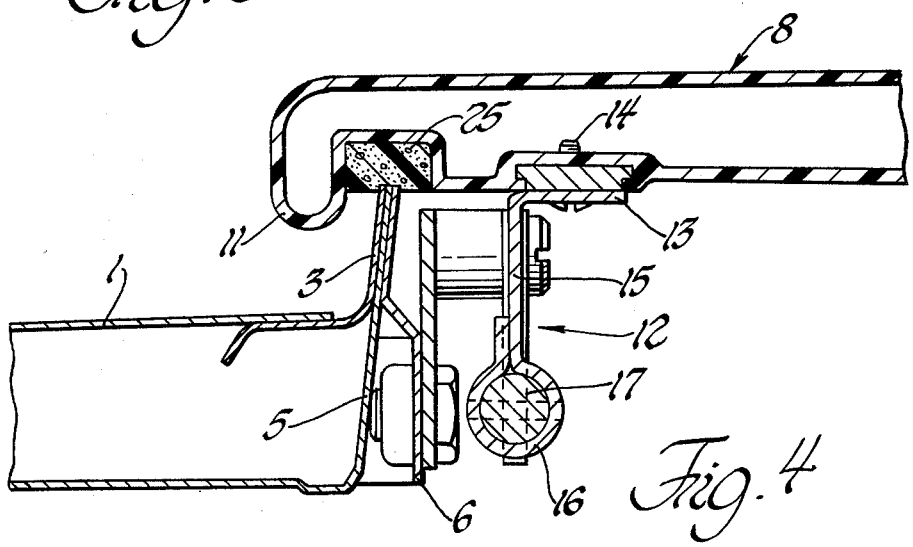
FIG. 4 is an enlarged fragmentary sectional view taken substantially on line 4—4 of FIG. 2.

Referring now in detail to the drawings, and first to FIGS. 1–6, a vehicle roof structure is shown as including an outer upwardly facing panel 1 having a generally rectangular opening 2 therein which, in accordance with the invention, may alternatively be used either for ventilating the interior of the vehicle, or as an escape hatch. Also included in the roof structure, as best seen in certain of FIGS. 1, 4–6, is an upwardly directed flange 3 which extends around the periphery of the roof opening, an inner roof panel 4 and reinforcement members 5 and 6. Serving as a cover for the opening 2 is a lid 8 shown formed of integrally joined upper and lower panels 9 and 10 whose lateral extremities overhang the roof opening flange 3 and are flanged downwardly in spaced relation therearound as at 11. Mounted to the underside of the lid 8 so as to extend into the roof opening 2 adjacent one side thereof is a first hinging means designated generally by the numeral 12. This hinging means 12 includes a bracket comprising a flange 13 underlying and secured to the lower panel 10 of the lid by screws 14, and a depending web section 15. Extending longitudinally with and secured to the lower extremities of the web section, as by forming it integrally therewith, is a cylindrical sleeve section 16 which rotatably and slidably supports two plungers 17, 18. Within the sleeve section and biasing the plungers apart therein is a coil compression spring 19. Pivotally connected to the outward end of plunger 17 is one end of a swinging link 20 whose other end is pivotally connected, as by a pin 21, to a support bracket 22. Similarly, the outward end of plunger 18 is pivotally connected to one end of swinging link 23 whose opposite end is pivotally connected by a pin 24 to the same supporting bracket 22. The axes for swinging movement of the links 20 and 23, as defined by the pins 21, 24, extend transversely of the bracket 12 and are spaced from each other on the supporting bracket 22 so that, by forcibly elevating the bracket 12 relative to the supporting bracket 22, either or both of the links 20, 23 may be swung into longitudinal alignment with their respective plungers 17, 18, additionally compressing the spring 19. When released, the compressive force of the spring, acting outwardly against the plungers causes each link 20, 23 to swing either clockwise or counterclockwise (dependent upon whether its pivotal connection to its plunger is above or below the longitudinal axis of the sleeve section 16). Thus, an over-center toggle linkage relationship between each plunger 17, 18 and its link 20, 24 is provided which acts either to bias the lid downwardly to its closed position shown in FIGS. 3 and 4, or upwardly to a limited open position in which one or both of the links 20, 24 are inclined upwardly from their pivot pins 21, 24. When the lid is in its closed position shown in FIGS. 3 and 4, the opening in the roof is sealed by abutment of the gasket material 25 on the underside of the lid with the roof opening flange 3.

In like manner, a second hinging means 112 is mounted to the underside of the lid so as to extend into the roof opening 2 adjacent the opposite side thereof from the hinging means 12. This second hinging means 112 (FIGS. 5 and 6) likewise includes a bracket comprising a flange 113 underlying and secured to the lower panel 10 of the lid by screws 114, and a depending web section 115 having a cylindrical sleeve section 116 formed integrally with its lower extremities. Within this sleeve section 116 are two plungers 117, 118 (See FIGS. 2), identical to the plungers 17, 18, and a compression spring (not shown, but identical to spring 19) between the plungers 117, 118 and biasing them outwardly of the sleeve section 116. Also in identical manner to the first hinging means 12, the plungers 117, 118 are pivotally connected to links 120, 123 whose opposite ends are pivotally connected by pins 121, 124 to a second supporting bracket 122, the spacing of the pins 121, 124 from each other being the same as that of pins 21, 24. Each of the supporting brackets 22 and 122 is adapted for mounting to the roof supporting structure, inwardly of and adjacent its respective side of the roof opening 2, as by bolts 26 and 126, respectively.

Because of their parallel relationship and identical linkage geometry, the two hinging means 12 and 112, which I do not claim to have invented per se, cooperate in either holding the lid fully closed against the flange 3 surrounding the opening 2 in the roof, or positioning the lid in any one of three partially open positions. Thus, starting with the lid in its fully closed position, it may be tilted upwardly about its side intermediate the link pivot pins 24 and 124 by manually applying sufficient upward force to the underside of the lid in the area thereof intermediate the link pivot pins 21 and 121 to cause the links 20 and 120 to swing upwardly about their pivot pins 21, 121, forcing their plungers inwardly against the biasing force of the springs in their bracket sleeve sections 16, 116, until the plunger connected ends of the links 20, 120 pass "over-center", i.e. the longitudinal axes of the sleeve sections extend above the pivot pins 21, 121. Similarly from a fully closed position, the lid may be tilted upwardly about its side intermediate the link pivot pins 21 and 121 by applying upward manual pressure to the area of the lid between the link pivot pins 24, 124 to cause the links 23, 123 to swing upwardly about their pivot pins 24, 124, to a like over-center position. Also with the lid tilted upwardly in either direction as described, it may also be additionally tilted in the opposite direction by manual application of upward force thereto in the area adjacent that side of the lid about which it had previously been tilted, thereby completing a bodily upward movement of the lid to the position shown in FIG. 1, wherein it accommodates "through-flow" ventilation of the interior of the vehicle. The links, by reason of their pivotal connections with their respective plungers and pivot pins in the supporting brackets 22 and 122, also serve to limit the opening movement of the lid. Also, the lid will remain in whichever partially open position it is placed, pending application of manual force to effect compression of the springs opposing the return of the links to their original positions.

Figure 5:
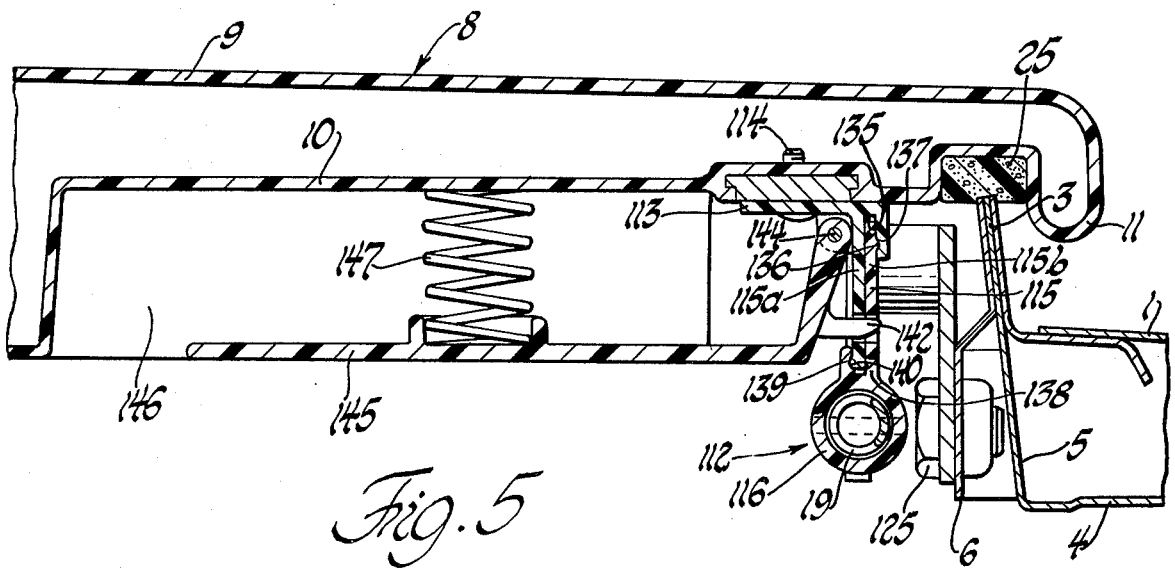
FIG. 5 is an enlarged fragmentary sectional view taken substantially on line 5—5 of FIG. 2.
Figure 6:
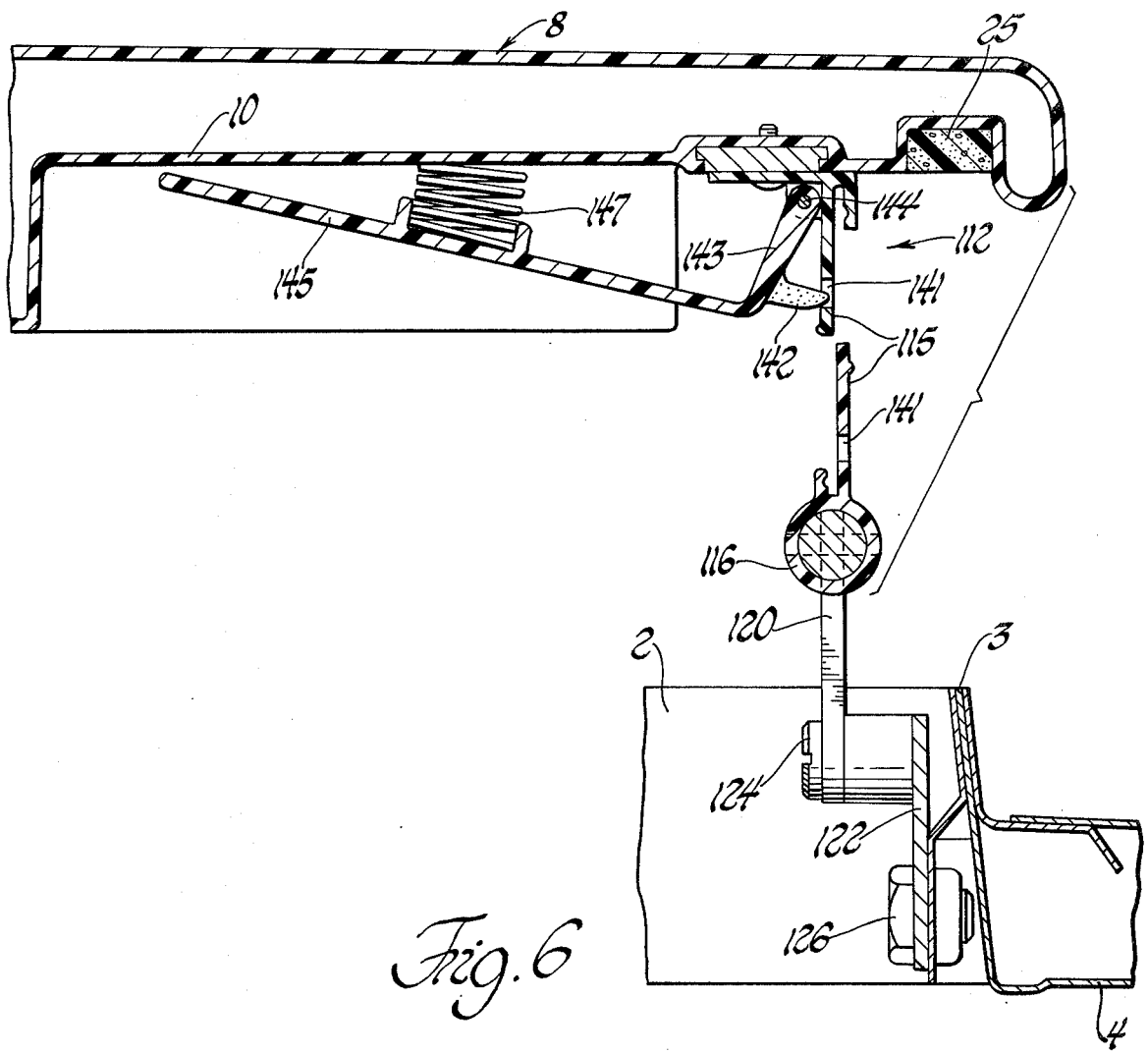
FIG. 6 is a view similar to FIG. 5 but with certain parts disengaged, enabling the lid to be swung to its fully open position for converting the roof ventilating opening to an escape hatch.

The means by which the lid may be fully opened to its escape hatch position will now be described. As best shown in FIGS. 5 and 6, the bracket portion of hinging means 112 which is connected to the lid is comprised of two separable members. One of these members is made up of the lid attaching flange 113 and a part 115A of the bracket web section 115, and the other consists of the sleeve section 116 and a part 115B of the web section 115. In their normal, initially assembled relation the two web section parts lie adjacent each other as shown in FIG. 5. Part 115A has a U-shaped upper portion 135 closely embracing the upper portion of web section part 115B, and one inner face of U-shaped portion 135 is provided with a groove 136 into which a ridge 137 on part 115B projects to further their mutual retention to each other. Similarly, part 115B has a U-shaped lower portion 138 closely embracing the lower portion of web section part 115A, and one inner face of U-shaped portion 138 is provided with a groove 139 receiving a projecting ridge 140 on part 115A. Preferably these parts 113, 115A, 115B and 116 are made of deformable but relatively stiff plastic material, such as "Nylon", or Nylon filled "Fiberglass", so as to resist vertical disengagement of the two web section parts 115A and 115B under forces applied upwardly against the lid of less than 60 pounds.

To further ensure against unintentional separation of the web section parts 115A and 115B, each is provided with one or more apertures 141 (FIG. 6). In the normal assembled condition of the parts these apertures are in aligned relation as between the parts 115A and 115B for reception of a retainer in the form of a projection 142 on a lever 143. The lever 143 is pivotally connected to the lid 8 by a pin 144 mounted in a boss depending from the flange 113, and has an operating arm 145 disposed opposite a recess 146 provided therefore in the lower panel 10 of the lid. A compression spring 147 interposed between the operating arm 145 and the recessed portion of the lid panel biases the lever to its normal position shown in FIG. 5, wherein the projection 142 is engaged with the aligned apertures in parts 115A and 115B.

In the event of an emergency requiring use of the roof opening 2 as an escape hatch, the lid may be swung to a fully open position by application of manual force in the order of 60 pounds against the operating arm 145 of the lever in the direction toward the lid. Such force will act to pivot the lever in a clockwise direction about the pivot pin 144 from the position shown in FIG. 5 to the position shown in FIG. 6, causing the spring 147 to compress, the lever projection 142 to move out of engagement with the apertures 141 in the web section parts 115A and 115B, and the handle of the lever to move into abutment with the underside of the lid lower panel 10. With the lever projection 143 thus disengaged from the apertures 141 and the handle 145 in abutment with the lid, such force is then effective in an upward direction against the lid, causing that side of the lid to swing upwardly. This upward swinging movement of the lid is accommodated by the sleeve section 16 rotating about its plungers 20, 23 in the manner of a hinge. If this emergency action is initiated with the lid in its fully closed position over the roof opening the sleeve section 116 can move upwardly a limited extent with the lid as the result of the links 120, 123 swinging upwardly about their pivot pins 121, 124 (to positions equivalent to those of links 20 and 23 in FIG. 1), but with continued upward swinging movement of the lid the tensile stress on the two-part web section 115 increases sufficiently to cause the part 115A thereof to separate from part 115B, freeing the lid to swing fully open, i.e. counterclockwise as viewed in FIG. 4 to a position substantially perpendicular to the vehicle roof panel 1. In such position of the lid, the roof opening 2 may be used as an escape hatch for occupants within the vehicle.

Figure 7:
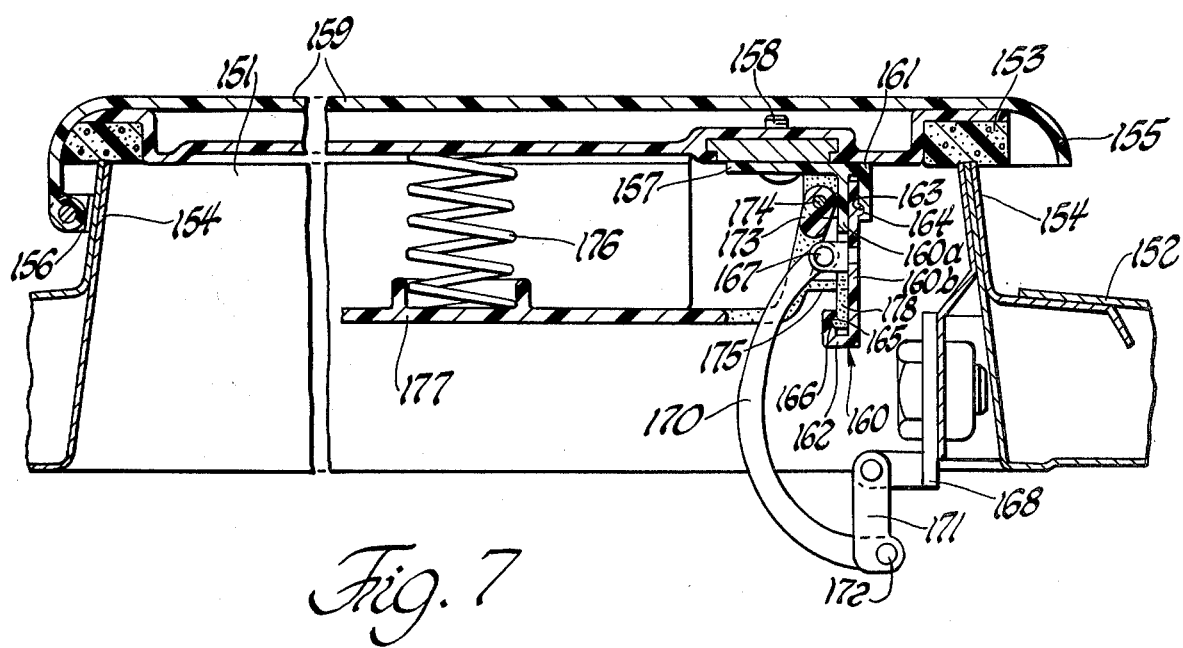
FIG. 7 is a transverse vertical sectional view of a modified form of the invention wherein the lid is openable to a ventilating position only by tilting it about a single hinge axis.

FIGS. 7-9 show a modification of my invention as applied to a simpler form of lid which is tiltable to a partially open or ventilating position about a single hinge axis. The lid 150, as in the previously described embodiment, is adapted to serve as a cover for an opening 151 in a vehicle roof 152. When in its fully closed position shown in FIG. 7, packing 153 on the underside of the lid seats against an upwardly presenting flange 154 which surround the roof opening. The lid is preferably flanged downwardly around its periphery as indicated at 155, and attached to this latter flange is a single piano-type hinge 156 which is adapted to be mounted as by bolting or welding (not shown) to the roof flange 154 at one side of the opening.

Secured to the lid so as to extend into the opening on the opposite side thereof from the hinge 156 is a bracket comprising a flange 157 underlying and secured, as by bolting 158, to an inner panel 159 of the lid, and a depending web section 160. This bracket is preferably made of deformable but relatively stiff plastic material such as Nylon or Nylon filled Fiberglass, and the web section 160 consists of two parts 160A and 160B initially assembled in side-by-side relation. The upper portion of part 160A has a U-shaped section 161 closely embracing the upper portion of part 160B, and the lower portion of part 160B similarly has a U-shaped section 162 closely embracing the lower portion of part 160A. One inner face of the U-shaped section 161 has a groove 163 into which a ridge 164 projects from the upper portion of part 160B, and the lower portion of part 160A has a ridge 165 projecting into a groove 166 on an inner face of U-shaped section 162.

Pivotally connected at 167 to the web part 160B is one end of an over-center or toggle-type linkage whose lower end is pivotally connected to a supporting bracket 168, adapted for mounting to the supporting structure of the vehicle roof. This linkage, shown as comprising an upper bell crank 170 and lower link 171, hinged together at 172, serves both as means for manually actuating the lid between its closed position shown in FIG. 7 and a partially open or ventilating position shown in FIG. 8, and as the means for normally limiting such upward tilting of the lid.

As in the previously described embodiment of FIGS. 1-6, I also provide a lever 173 which is pivoted to the lid at 174 and has projections 175 normally engaging aligned apertures 179 in the two web section parts 160A and 160B. A spring 176 interposed between the handle portion 177 and the underside of the lid serves to normally maintain the lever in such position. The central portion of the web section part 160A has a recess 178 (see FIG. 9) to provide clearance for withdrawal of the bell crank 170 and its pivotal connection to the web section part 160B.

The lever 173 functions in the same manner as the lever 143 of the previously described embodiment upon application of upward manual force to the handle portion in the event of an emergency requiring actuation of the lid to a fully open position. Such a force, in the order of 60 pounds, caused the lever to pivot against the biasing force of the spring, withdrawing the lever projections 175 from engagement with the apertures 179 in the web section parts 160A and 160B. Thereafter, upon the lever handle portion moving into abutment with the lid, the lever connected side of the lid is forced upwardly, swinging about the axis of hinge 156, and effecting forcible separation of the web section parts 160A and 160B.

It will be appreciated that various minor changes in the parts or their arrangement may be made without departing from the scope of the invention as hereinafter claimed.

I claim:

1. In combination with a vehicle roof having an opening and an upwardly movable hinged lid therefor, means normally limiting upward movement of the lid to a tilted position accommodating use of the opening to vent the vehicle, said means comprising a lever pivotally connected at one end to the lid for upward movement of its other end into abutment with the underside of the lid, a bracket comprising two parts normally extending in parallel side-by-side relation to each other adjacent one side of said opening, one of said parts being fixed to the lid, and a link pivotally securing the other of said bracket parts to the vehicle roof, each of said parts having an aperture normally aligned with the aperture in the other, said lever having a projection normally engaging the aperture in each said part but movable out of engagement therewith in response to pivotal movement of said lever other end into abutment with the lid, said lever other end having a handle for transmitting sufficient manual upward force to the lid to effect separation of said bracket parts following disengagement of said projection from said apertures.

2. In a combination vehicle roof vent and escape hatch, a vehicle roof having an opening, a lid hinged to the roof for upward tilting movement about one side of the opening, and means normally limiting said tilting movement to permit only a partial uncovering of the opening by the lid for vehicle ventilation, said limiting means including a lever, two detachable members extending in parallel side-by-side relation to each other and a link connecting one of said members to the roof, the other of said members being fixed to the lid, said members having apertures normally in alignment with each other, said lever having a pivotal connection with the lid accommodating movement of the lever upwardly into abutment with the lid and having a projection normally engaging said apertures but movable out of engagement with said apertures in response to movement of the lever into abutment with the lid, said members being detachable from each other to permit further tilting movement of the lid to an escape hatch position substantially normal to the roof by application of upward manual force to said lever while in abutment with the lid.

3. The structure of claim 2, wherein one of said members has a U-shaped section closely embracing the other of said members prior to their separation, one of the legs of said U-shaped section and the oppositely facing surface of the embraced member having a projecting ridge, the other of said one leg and said oppositely facing surface having a groove operative to releasably retain said ridge and thereby provide resistance to detachment of said members from each other when said manual upward force is applied with said lever in abutment with the lid.

4. The structure of claim 2, wherein each said member has a U-shaped section closely embracing the other of said members prior to their separation, one of the legs of each said U-shaped section and the oppositely facing surface of the member embraced thereby having a projecting ridge, the other of said one leg and oppositely facing surface having a groove operative to releasably retain said ridge and thereby provide resistance to detachment of said members from each other when said manual upward force is applied with said lever in abutment with the lid.

5. In combination with a lid for a combined ventilation and escape hatch opening in a vehicle roof structure, parallel extending first and second brackets each having a web section depending from the lid, each said bracket including a cylindrical sleeve section extending longitudinally of and secured to the lower extremities of its web section, a pair of plungers axially rotatable and reciprocable in the respective ends of each sleeve section, spring means in each sleeve section biasing the plungers outwardly thereof, each said plunger having a link extending from and pivotally connected thereto, support means adapted for mounting to the vehicle roof structure, said support means journaling the opposite ends of the links associated with each said bracket for pivotal movement about respective spaced axes extending transversely of both said bracket means, the spacing of said axes from each other in conjunction with the biasing force of said spring means being operative to provide an over-center toggle linkage relationship between each plunger and its pivotally connected link enabling the lid to be tilted in either of two angularly disposed positions relative to said support means, as well as to be displaced vertically relative to said support means, one of said web sections comprising two separable web-forming parts in side-by-side relation, said parts having aligned apertures, a retainer interengaging said apertures to oppose separation of said web-parts, and a lever pivotally connected to the lid intermediate said web sections and having a handle portion pivotable with the lever into abutment with the lid for applying manual upward force against the lid, said retainer being connected to the lever for withdrawal from said apertures in response to pivotal movement of said handle portion into abutment with the lid.

6. In combination with a lid for a vehicle roof opening, first hinging means connected to the lid and including a support bracket adapted for mounting to the roof adjacent one side of said opening, second hinging means connected to the lid in laterally spaced relation to said first hinging means and including a support bracket adapted for mounting to the roof adjacent the opposite side of said opening, each said hinging means including a second bracket having a web section depending from the lid and a cylindrical sleeve section supported by said web section, a pair of axially spaced plungers slidably reciprocable in said sleeve section, spring means interposed between the adjacent ends of said plungers and acting to bias said plungers apart, and first and second links each pivotally connected at one of its ends to said support bracket and pivotally connected at its opposite end to one of said plungers, said first and second links of each hinging means having a relative angular disposition to each other in the closed position of the lid such that their plunger connected ends are closer to each other and more distant from the lid than their opposite ends, said spring means being yieldable in response to vertical movement of the lid relative to said support brackets to accommodate pivotal movement of the links to positions such that the longitudinal axes of said sleeve sections extend above the plunger connected ends of said links, whereby said lid may be selectively tilted upwardly about the plunger connected ends of said first links, tilted upwardly about the plunger connected ends of said second links or moved bodily upward with concurrent pivotal movement of all of said links, said web section of one of said second brackets comprising a first web part rigidly joined to its associated sleeve section and a second web part rigidly connected to the lid, said web parts being in normally overlapping relation to each other and each having an aperture normally aligned with the aperture in the other, a projecting member normally engaging both said apertures, and means for withdrawing said projecting member from said apertures and separating said web parts to accommodate swinging of the lid to a full open position about the axis of the plungers in the other of said second brackets, said last named means including a lever pivotally carried by the lid between said hinging means, said projecting member being carried by the lever, said lever being pivotable into abutment with the lid for effecting withdrawal of said projecting member and application of upward manual force to the lid.

7. In combination with a lid for a vehicle roof opening, hinging means connected to the lid and adapted for mounting to the roof adjacent said opening, said hinging means accommodating upward tilting movement of the lid about an axis adjacent one side of said opening, means normally limiting said tilting movement to a partially open position of the lid accommodating ventilation of the vehicle via said opening, said limiting means comprising a first member fixed to the lid laterally of said axis and a second member adapted to be fixed to the vehicle roof and extending parallel to said first member, one of said members having a portion normally embracing a portion of the other member, said member portions having apertures in alignment with each other when said one member portion is in its embracing relation with said other member portion, and a lever below and pivotally mounted to the lid for movement toward the lid in the direction in which the lid is tiltably openable about said axis, said lever having a projection normally engaging both said apertures but withdrawable therefrom in respone to said pivotable movement of the lever toward the lid to accommodate separation of said members and extended pivotal movement of the lid to a position enabling use of said roof opening as an escape hatch.

* * * * *